(12) United States Patent
Callway

(10) Patent No.: US 6,621,499 B1
(45) Date of Patent: Sep. 16, 2003

(54) VIDEO PROCESSOR WITH MULTIPLE OVERLAY GENERATORS AND/OR FLEXIBLE BIDIRECTIONAL VIDEO DATA PORT

(75) Inventor: Edward G. Callway, Toronto (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/225,117

(22) Filed: Jan. 4, 1999

(51) Int. Cl.$^7$ ................................................. H04N 9/74
(52) U.S. Cl. ........................ 345/629; 345/949; 345/950; 345/951; 345/634; 382/284; 348/589; 348/590; 348/591; 348/592; 348/585
(58) Field of Search ................................ 345/629, 630, 345/634, 501, 519, 530, 949, 950, 951, 641; 382/284; 348/589–592, 585

(56) References Cited

U.S. PATENT DOCUMENTS

| | | | | |
|---|---|---|---|---|
| 5,220,312 A | * | 6/1993 | Lumeisky et al. | 340/721 |
| 5,254,984 A | * | 10/1993 | Wakeland | 345/144 |
| 5,583,536 A | * | 12/1996 | Cahill, III | 345/113 |
| 5,598,525 A | * | 1/1997 | Nally et al. | 395/520 |
| 5,634,040 A | * | 5/1997 | Her et al. | 395/502 |
| 5,710,573 A | * | 1/1998 | Hung et al. | 345/127 |
| 5,877,741 A | * | 3/1999 | Chee et al. | 345/113 |
| 5,883,610 A | * | 3/1999 | Jeon | 345/113 |
| 5,889,499 A | * | 3/1999 | Nally et al. | 345/7 |
| 6,157,415 A | * | 12/2000 | Glen | 348/453 |
| 6,177,946 B1 | * | 1/2001 | Sinclair et al. | 345/501 |
| 6,184,906 B1 | * | 2/2001 | Wang et al. | 345/521 |
| 6,249,288 B1 | * | 6/2001 | Campbell | 345/435 |
| 6,310,659 B1 | * | 10/2001 | Glen | 345/660 |

OTHER PUBLICATIONS

Video Electronics Standards Association (VESA): VESA Video Interface Port (VIP), Version: 2, October 21, 1998.

* cited by examiner

Primary Examiner—Michael Razavi
Assistant Examiner—Daniel J Chung
(74) Attorney, Agent, or Firm—Vedder, Price, Kaufman & Kammholz, P.C.

(57) ABSTRACT

A video processing device and method receives data from a common data source, such as a frame buffer and outputs first overlay information in a first color space from a first port and outputs second overlay information in a second color from a second port to facilitate output of multiple overlay images in different color spaces from common memory through different ports. In one embodiment a bidirectional port is used to allow a set of common signal pads or a bus to function as a flexible bidirectional video data port. The bidirectional video data port includes, for example, a port containing a set of common signal pads, a first unidirectional output switch selectable to output, for example, graphic data in a first format over the port, a second unidirectional output switch coupled to the common port that is configurable to selectably output graphics and/or video data, and an input buffer operatively coupled to a video capture engine and to the set of common signal pads that receives input video data in a different format to facilitate operation as a flexible bidirectional video data port.

10 Claims, 6 Drawing Sheets

VIDEO PROCESSOR WITH MULTIPLE OVERLAY GENERATORS AND/OR FLEXIBLE BIDIRECTIONAL VIDEO DATA PORT

FIELD OF THE INVENTION

The invention relates generally to video processing devices and methods and more particularly to video processing devices and methods having a bidirectional port and/or multiple overlay image generators such as keyers or alpha blenders.

BACKGROUND OF THE INVENTION

Video processing devices, such as video graphics controllers and other video processing devices may be designed to facilitate the presentation of both graphic data and video data on a display device, such as a computer screen. For example, with multimedia applications, a computer user may be using a word processor while watching a movie. The video processor generates overlays so that the movie appears in a corner or window within the display screen simultaneously with text information from the word processor application. Complex format conversions, scaling, video decompression, and other processes may be necessary. In addition, video processing devices, such as graphics controller chips, may have multiple input/output ports to allow data to be transferred from or to various video encoders, digital decompression modules, digital-to-analog converters, flat panel displays, television output ports and many other peripheral blocks.

Some video processing circuits allow compatibility with older and newer video formats over a common bus or port. For example, FIG. 1 shows a block diagram of a conventional video graphics processor having a frame buffer 10 that stores both graphics data and video data. The frame buffer 10 may be one or more memory modules. In one direction, the frame buffer, through common port 12, receives video information 14 through a buffer 16 via a video capture engine 18, as known in the art. The video capture engine then stores the captured video in the frame buffer 10. In another direction, through the common port 12, the graphics controller can output graphics information 20 obtained from graphics memory reader 22 to a data serializer 24 through a unidirectional output switch 26. The unidirectional output switch 26 may be, for example, a group of tri-state buffers controllable by control signal 28 by a host computer, for example, to allow the direction of information from the common port to flow out from the port or be received from the port through the buffer 16.

An image overlay generator 30 receives graphics information 20 and video information 32 obtained by video memory reader 31 and combines the data 33 for display, for example, on a television through a television out port 34 or may output the combined information 33 to a digital-to-analog converter 36, a flat panel display 38 or other suitable device, process or subprocess. A color space converter 40 converts, for example, video data that may be in Y,Cr,Cb format to RGB format that can be accommodated by the image overlay converter 30. It is useful to reduce the number of color space converters since the converters require integrated circuit space and absorb processing capabilities of the video graphics controller for each conversion.

Conventional graphics controllers may also include, for example, a palletizer RAM 42 that stores graphics data in a predefined format, and if desired, an unpacker 42 that unpacks graphics data that has been stored in a predefined format in the frame buffer. The graphics controller outputs the palletized information or unpacked information to a switch 46 which then allows information to be sent to the serializer 24 or image overlay generator 30. The graphics information is typically in a RGB color space format, and video data is typically in a Y,Cr,Cb color space (digital). As such, a color space converter 52 may be used to convert RGB information from the video memory reader to Y,Cr,Cb information and is passed through a switch 54 to a scaler 56. The scaler 56 may scale the video information to fit within a smaller or larger window within the display space, for example.

A conventional video graphics controller may be connected through a common port to a video encoder 60, a video decompressor 62, such as an MPEG video decompressor, a video decoder 64 and a video compressor 66, such as an MPEG video compressor. The encoders and compressors are typically used to convert data to and from the graphics controller to suitable compressed or decompressed format for other devices, such as digital video discs (DVD's), other display devices and software applications. As shown by arrows 68a, 68b, 68c and 68d the output from the video decoder may be passed directly to an MPEG compressor to be compressed for another subsystem or software application within a multimedia system or video system. A control signal 28 is again used to control whether the decompressor or decoder is operational.

It becomes increasingly important to keep the size of graphics controllers and video processing devices small while still increasing the amount of video and-graphics processing ability and types of video processing capabilities. Conventional processors often add additional ports or pins to accommodate additional functionality. In addition, systems such as those shown in FIG. 1 typically do not provide the capability of allowing multiple overlays to be output from a common data source. With the increasing number and types of different displays that may be coupled to a single graphics processing device, it would desirable to allow multiple displays to show the same or differing overlay if desired from the same data source, such as buffer memory 10.

Consequently, a need exists for a video processing device and method that facilitates additional functionality over a common port and if desired, to provide additional overlay capability for multiple displays and/or peripheral modules to allow independent or dual processing of graphics and video overlay information.

DETAILED DESCRIPTION OF A PREFERRED EMBODIMENT OF THE INVENTION

Briefly, a video processing device and method receives data from a common data source, such as a frame buffer and outputs first overlay information in a first color space from a first port and outputs second overlay information in a second color from a second port to facilitate output of multiple overlay images in different color spaces from common memory through different ports. In one embodiment a bidirectional port is used to allow a set of common signal pads or a common bus to function as a flexible bidirectional video data port. The bidirectional video data port includes, for example, a port containing a set of common signal pads, a first unidirectional output switch selectable to output, for example, graphic data in a first format over the port, a second unidirectional output switch coupled to the common port that is configurable to selectably output graphics and/or video data over the same port, and an input buffer operatively coupled to a video capture engine and to the common port that receives input video data in a different format to facilitate operation as a flexible bidirectional video data port.

Figure 1:
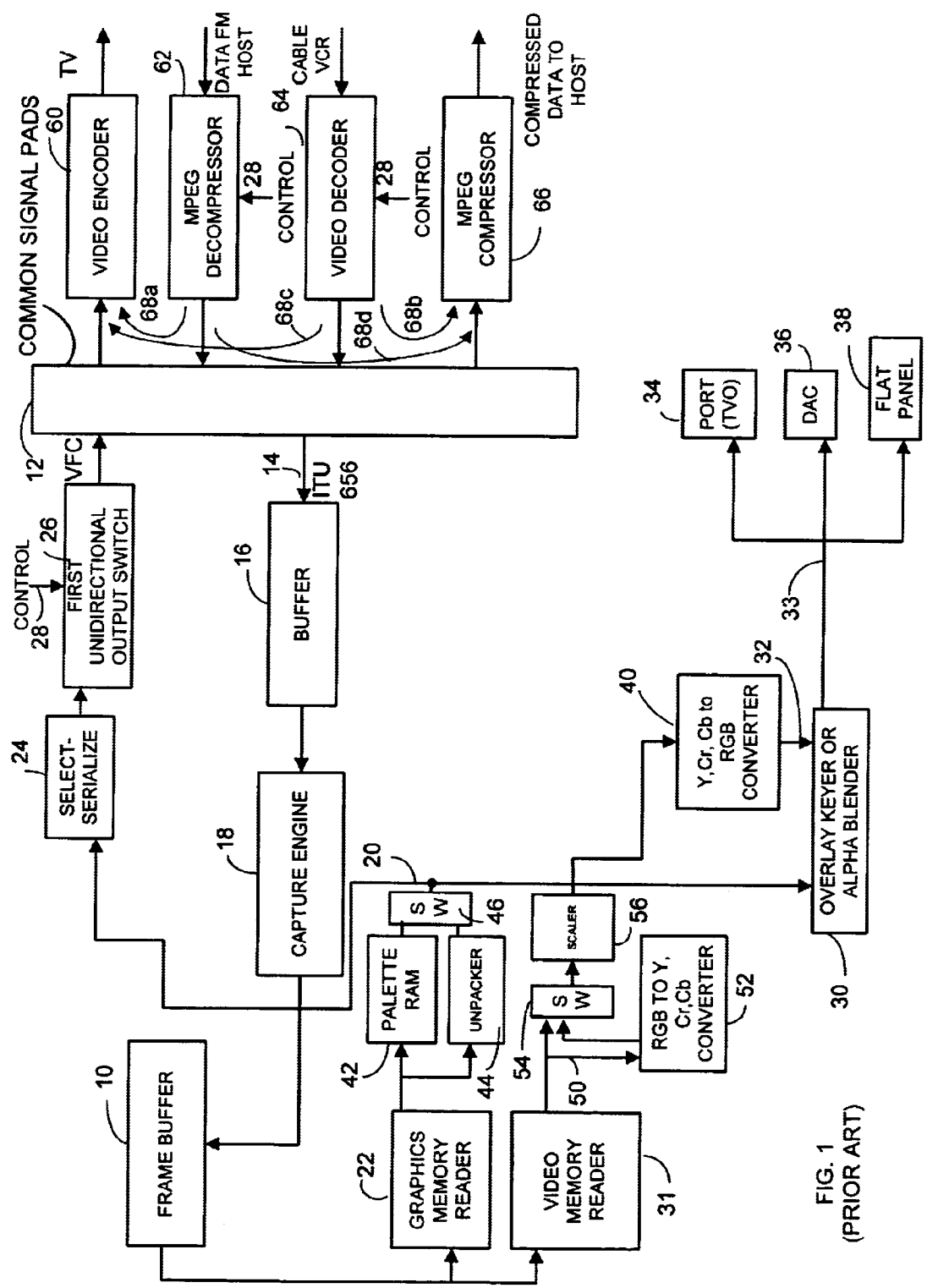
FIG. 1 is a block diagram of a portion of the prior art video processing device.
Figure 2:
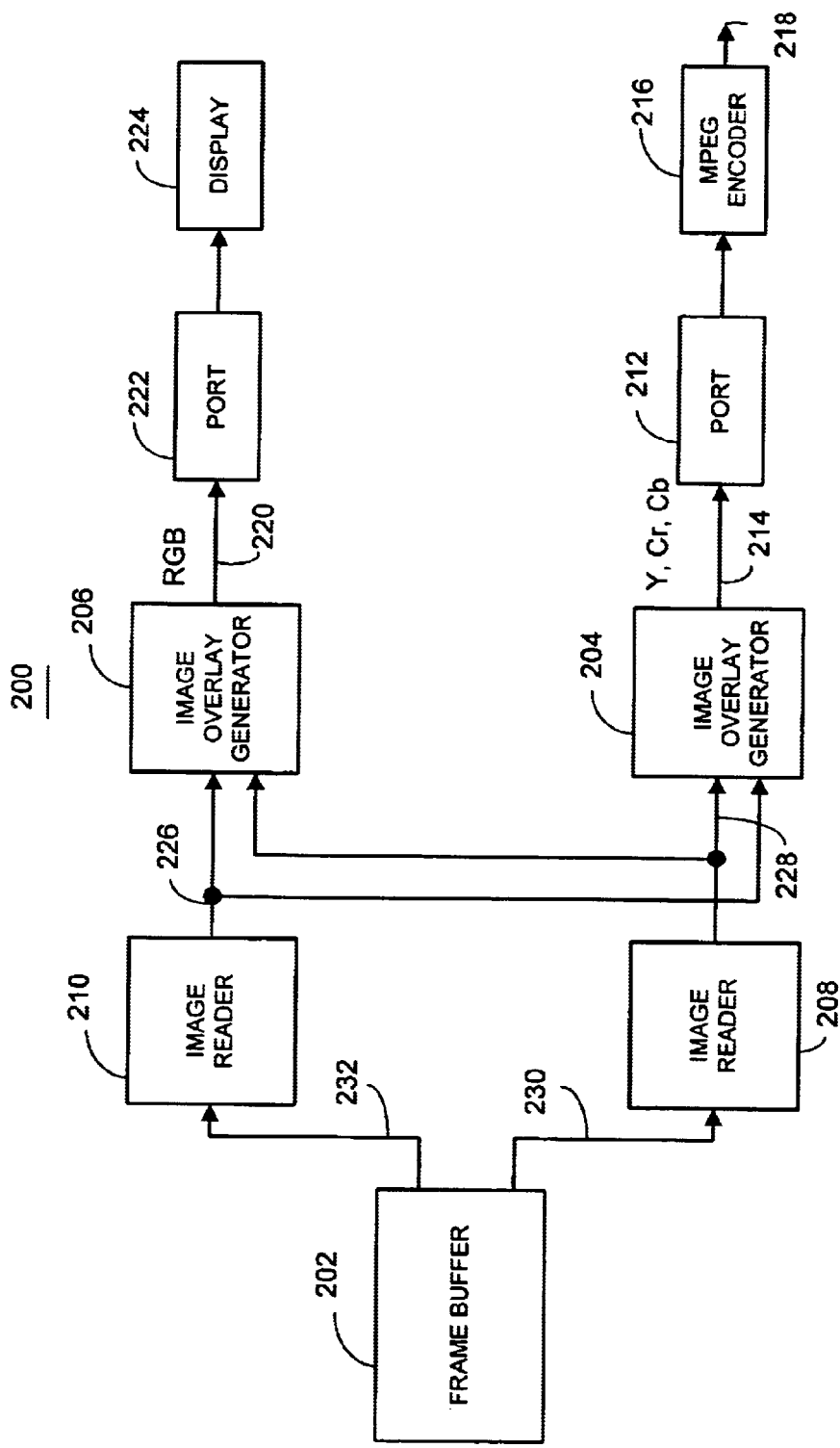
FIG. 2 is a block diagram of a video processing device having multiple overlay image generators coupled to multiple ports in accordance with one embodiment of the invention.

FIG. 2 shows a video processing device 200 having a frame buffer 202, a first overlay image generator 204, such as a keyer or alpha blender, and a second overlay image generator 206, such as a keyer or alpha generator. The video processing device 200 also includes a first image reader 208, such as a video data memory reader and another image reader 210, such as a graphics data memory reader. The image readers 208 and 210 are operatively coupled between the frame buffer 202 and the first and second overlay image generators 204 and 206 to allow the image generators to receive data from the frame buffer. The first overlay image generator 204 may be, for example, a keyer designed to combine data in Y,Cr,Cb color space is coupled to receive data from the frame buffer 202 and is coupled to a first port 212, such as a bus or signal pads. The first overlay image generator 204 outputs overlay information 214 in a Y,Cr,Cb color space to the first port 212 for any suitable device process or subprocess, such as an MPEG type encoder 216. The MPEG encoder may be any suitable MPEG-2 encoder as known in the art and outputs encoded video 218.

The second overlay image generator 206 outputs overlay information-220 in a different color space, such as RGB to a different port 222 to facilitate output of overlay information from a common data source out another port of the video processing device. The other port 222 is used to output overlay information such as in RGB format, to display device 224.

Each of the first and second overlay image generators 204 and 206 receive data from both image readers 208 and 210. For example, image data such as graphics data 226 is received by both the first and second overlay image generator 204 and 206. Similarly, other image data to be overlayed with the graphics image data 226, such as video data 228 is received by both the first and second overlay image generators 204 and 206. Each of the image readers 208 and 210 obtain respective image data 230 and 232 from a common data source, such as the frame buffer 202. The frame buffer may include a plurality of memory circuits. The image data 230 may be, for example, video image data whereas the image data 232 may be graphics data. The image readers 208 and 210 and/or overlay generators 204 and 206 may perform any suitable color space conversion as necessary, so that the overlay image generators may suitably overlay graphics and video data or other combinations of information. The multiple overlay image generators output overlay images in different color spaces from common memory 202 through different ports 212 and 222. As such, the device may be used to output the same or different overlay information on multiple displays or to other processes or subprocesses within a video processing and/or display system. In addition, as previously indicated, each of the overlay image generators 204 and 206 may overlay differing image data so that differing overlays may be obtained from the same common source data (e.g., from buffer 202).

Figure 3:
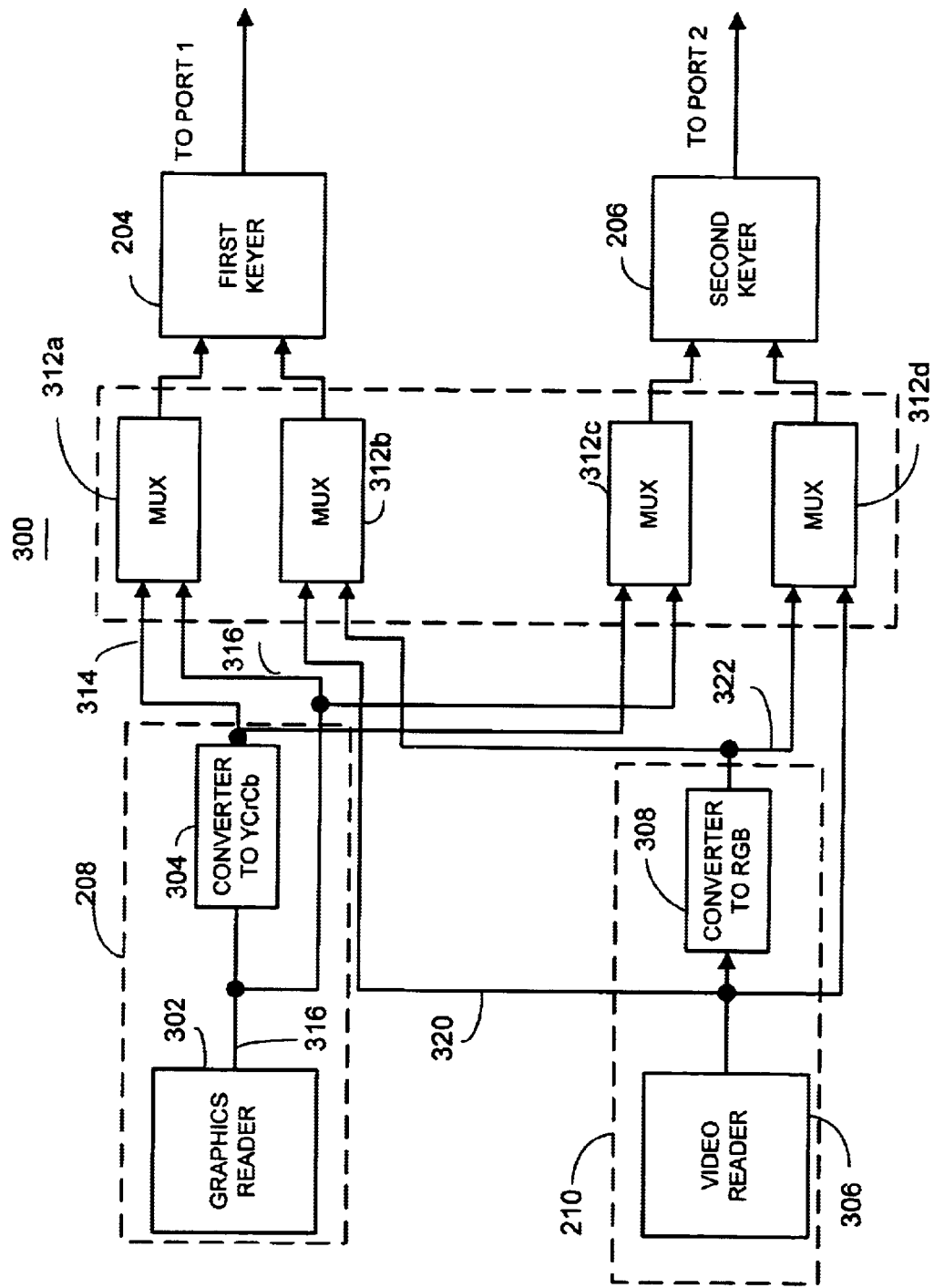
FIG. 3 is a block diagram illustrating an alternative embodiment of a video processing device employing a plurality of overlay image generators in accordance with the invention.

FIG. 3 shows another embodiment of a video processing device 300 having multiple overlay image generators 204 and 206 to facilitate multiple overlay image output in different color spaces from common memory through different ports. In this embodiment, the image readers 208 and 210 each include a color space converter. By way of example, image reader 208 may include a graphics data reader 302 which may output graphics data in an RGB color space or other color space, to a color space converter 304 which converts RGB information to another color space, such as Y,Cr,Cb color space. Similarly, image reader 210 may include, for example, a video data reader 306 that obtains video data from the frame buffer 202 (FIG. 2) and outputs video data in Y,Cr,Cb format to a color space converter 308. The color space converter 308 converts the Y,Cr,Cb video data from video reader 306 to an RGB format or other suitable format. The video processing device 300 also includes a switching block 310 that may include, for example, a plurality of multiplexors 312a–312d. Multiplexors 312a and 312b are used to multiplex image information, such as graphics data and video data to the first overlay image generator 204 for output to port 212. The multiplexors may be under control of a host computer or other controller. As shown, multiplexor 312a receives graphics data either in the form of converted Y,Cr,Cb data 314 or graphics data in RGB format from 316 from the graphics data reader 302. Also, multiplexor 312c associated with the second overlay image generator 206 receives the same graphics data in multiple color space formats such as graphics data 314 and graphics data 316.

Multiplexor 312b, also associated with the first overlay image generator 304, receives video data 320 from the video reader 306, such as in the color space format Y,Cr,Cb. The multiplexor 312b also receives, as input data, converted video data converted to a different color space such as RGB data 322. As such, the multiplexors 312a and 312b may switch in any combination of color space graphics and image data to the overlay image generator 204 so that the overlay image generator 204 can output overlay images in different color spaces. Similarly, multiplexors 312c and 312d multiplex graphics data and video data in different color spaces to the second overlay image generator 206 so that the second overlay image generator 206 can output overlay images in different color spaces from common memory.

Figure 4:
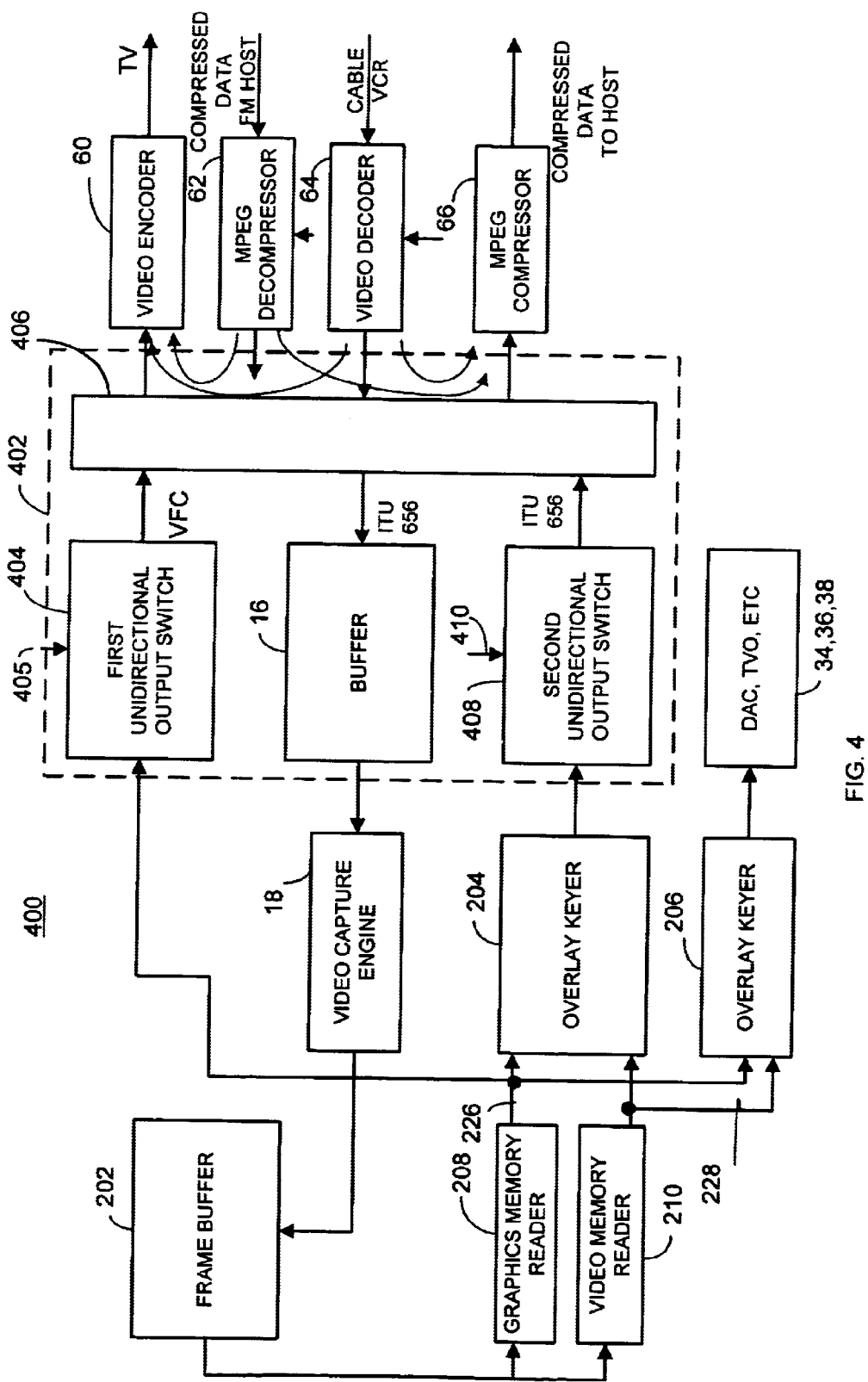
FIG. 4 is a block diagram of one embodiment of a video processing device in accordance with the invention.

FIG. 4 shows another embodiment of a video processing device 400 that includes a flexible bidirectional video port 402. Although both overlay image generators 204 and 206 are shown, it will be recognized that only one of the overlay image generators need be used. As shown, the image reader 208, such as a graphics memory reader reads graphics data from the frame buffer 202 for both overlay image generators 204 and 206. In this embodiment, the graphics memory reader reads graphics data for the first overlay image generator 204. The image reader 210, such as a video memory reader is operatively coupled to the frame buffer to read video data from the frame buffer for at least one of the first and second overlay image generators. In this embodiment, the video memory reader generates video data for both overlay image generators.

The flexible bidirectional video data port 402 includes a first unidirectional output switch 404 that may be used, for example, to output palletized data for compatibility with VESA Feature Connector (VFC) modes, as known in the art. The unidirectional output switch 404 is selectable through a first control line 405 to output, for example, graphics data over common port 406. The bidirectional video data port 402 also includes a second unidirectional output switch 408 which is operatively coupled to one of the image overlay generators, such as image overlay generator 204, and to the common port 406. The second unidirectional output switch 408 is configurable to selectively output either graphic data or video data, or both, from the overlay image generator over the common port 406. The format of the data may be, for example, ITU-656 formatted video. The bidirectional video data port 402 also includes an input buffer 16 coupled to the video capture engine 18 and to a common port 406 and receives input video data from the common port 406 such as, for example, video data in the form of ITU-656 formatted video. As such, the bidirectional video data port 402 facilitates a reduction of bus lines or signal pads by allowing output of graphics data in one format and overlay data in a different format and the input of video data over the same port. As such, different data from a common frame buffer 202 may be output through second unidirectional output switch 408 or first unidirectional output switch 404. The second unidirectional output switch is selectable via a second control line 410 which may be controlled, for example, by a host computer to control the direction of data flow to and from the video processing device.

Figure 5:
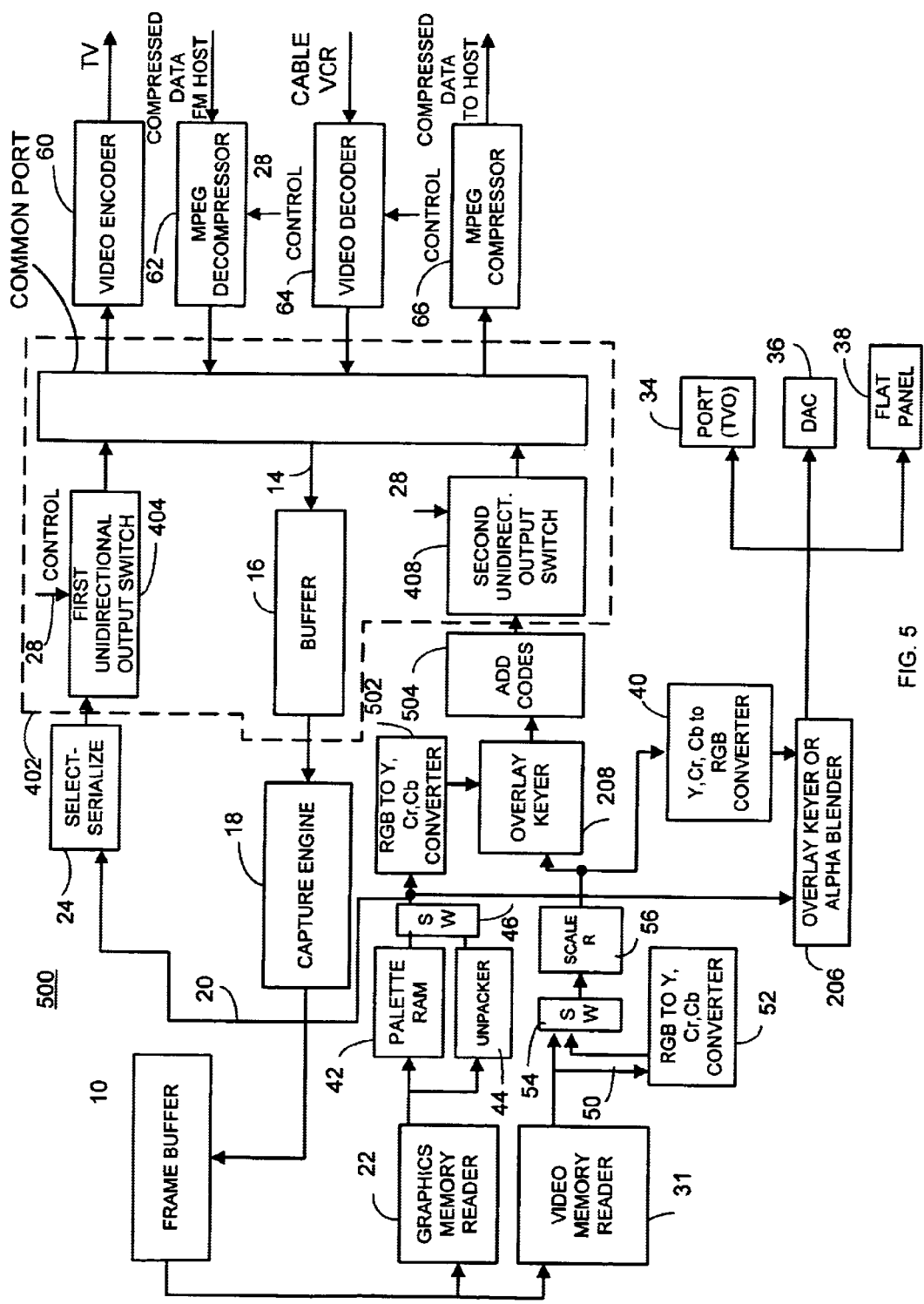
FIG. 5 is a block diagram of a video processing device in accordance with one embodiment of the invention.

FIG. 5 shows in more detail the system of FIG. 4. As shown, the video processing device 500 also includes a color space converter 502 coupled between the graphics memory reader 22 and overlay image generator 208 to convert, for example, graphics data in one color space to graphics data in another color space, in the event, for example, the overlay image generator 208 is only capable of accommodating one color space. In addition, a code adder 504 may multiplex additional signal lines for selection by the second unidirectional output switch 408 to allow the addition of, for example, horizontal synchronization, vertical synchronization, and other signals suitable to accommodate particular video signal formats, such as indicated in standard ITU-656.

Figure 6:
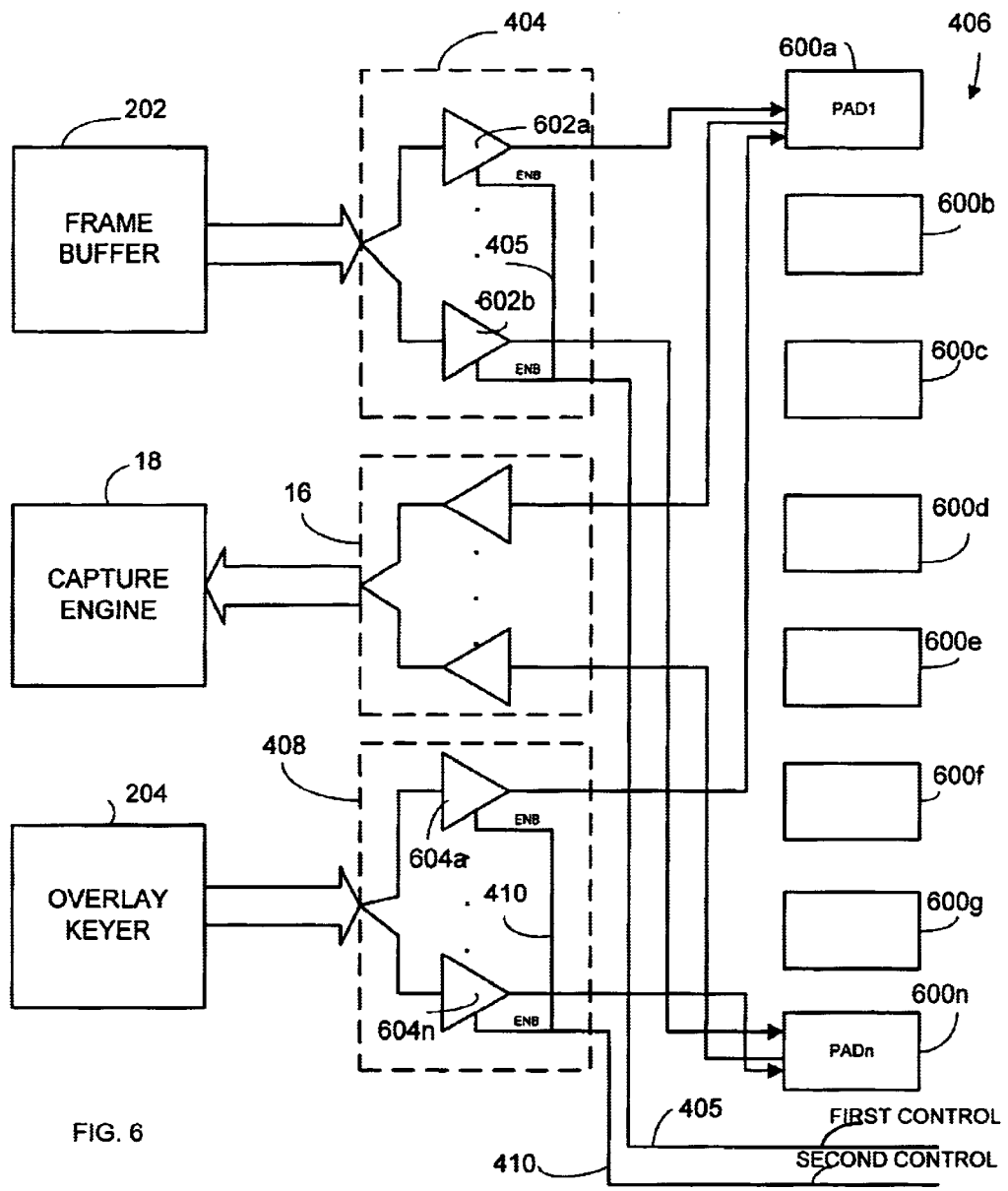
FIG. 6 is a block diagram illustrating a video processing device of FIG. 5 showing in more detail a bidirectional flexible video port in accordance with the invention.

FIG. 6 shows an example of a first and second unidirectional output switches 404 and 408 and buffer 16 coupled to common port 406 which in this embodiment is a plurality of signal pads 600a–600n. The first unidirectional output switch 404 may include a plurality of tri-state buffers 602a–602n that are enabled by control line 405. Similarly, the second unidirectional output switch 408 may include a plurality of tri-state buffers 604a–604n that may be put in a tri-state mode or active mode by control line 410.

In operation, the video processing device receives data from a frame buffer and outputs first overlay information that is in a first color space from a first port and outputs second overlay information in a second color space from a second port to facilitate output of multiple overlay images in different color spaces from common memory through different ports (see, for example, FIG. 2). The method may also include reading graphics data from the frame buffer for use in generating first and second overlay information and reading video data from the frame buffer for use in generating the first and second overlay information. Where conversion may be necessary, the system also converts graphic data in a first color space for one overlay image generator and also converts video data in a second color space for a different overlay image generator. Data may be provided from a common port to at least one of a video encoder, a video decoder, a video compressor and a video decompressor.

As such, the system allows a bidirectional data port to receive decompressed digital video while efficiently passing decompressed video data out from the video processor to a common port so that a host computer need not process video data which can require a compression or decompression circuit to burden the host processor. As such, the video processing device may transfer decompressed or compressed video for compression or decompression by other applications. Among other differences, unlike prior art systems that typically only allowed the output of graphics data, the system allows the output of overlayed information including video data out a common port and also the flexibility of having multiple image overlay generators to facilitate diverse overlay applications out differing ports.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A video processing device comprising:
   a first unidirectional output switch selectable to output at least graphic data over a common port;
   a second unidirectional output switch, operatively coupled to a common set of signal paths of the common port, configurable to selectively output at least one of graphic and video data;:
   a first overlay image generator operatively coupled to the second unidirectional output switch wherein the overlay image generator receives graphics data from a graphics memory reader and video data from a video memory reader to facilitate output of overlayed graphics data and video data from the second unidirectional output switch;
   a second overlay generator operatively coupled to receive data from the frame buffer and operatively coupled to output second overlay information from a port different from a port associated with the port; and
   an input buffer, operatively coupled to a video capture engine and to the common port, that receives input video data to facilitate operation of the common port as a flexible bi-directional video data port.

2. The video processing device of claim 1 further including an RGB to Y, Cr, Cb converter operatively coupled between the graphic memory reader and the first overlay image generator.

3. The video processing device of claim 2 wherein the second overlay image generator is operatively coupled to the graphics memory reader and the video memory reader and a peripheral port.

4. The video processing device of claim 1 wherein the first and second unidirectional output switches are comprised of tri-state buffers controllable by a host processing device.

5. A video processing device comprising:
   A frame buffer;
   a first overlay image generator, operatively coupled to receive data from the frame buffer and operatively coupled to a first port, that outputs first overlay information in a first color space from the first port;

a second overlay image generator, operatively coupled to receive data from the frame buffer and operatively coupled to a second port, that outputs second overlay information in a second color space from the second port, to facilitate output of multiple overlay images in different color spaces from common memory through different ports;

a graphics memory reader operatively coupled to read graphics data from the frame buffer for at least one of the first and second overlay image generators;

a video memory reader operatively coupled to read video data from the frame buffer for at least one of the first and second overlay image generators; and a common port comprising:
    a first unidirectional output switch selectable to output at least graphic data over the first port;
    a second unidirectional output switch, operatively coupled to the first overlay image generator and the first port, configurable to selectively output at least one of graphic and video data from the first overlay image generator over the first port
    an input buffer, operatively coupled to a video capture engine and to the first port, that receives input video data from the first port.

6. The video processing device of claim 5 wherein the graphics memory reader is operatively coupled to read graphics data from the frame buffer for both the first and second overlay image generators, the video memory reader is operatively coupled to read graphics data from the frame buffer for both the first and second overlay image generators; and further including:
    a first color space converter operatively coupled between the graphics memory reader and the first overlay image generator; and
    a second color space converter operatively coupled between the video memory reader and the second overlay image generator.

7. The video processor of claim 5 including at least a video encoder, a video decoder, a video compressor and a video decompressor operatively coupled to the first port.

8. A video processing device comprising:
    a method for processing video comprising the step of:
        receiving data from a frame buffer;
        outputting first overlay information in a first color space from a first port;
        outputting second overlay information in a second color space from a second port, to facilitate output of multiple overlay images in different color spaces from a common memory through different ports;
        reading graphics data from the frame buffer for use in generating the first and second overlay information;
        reading video data from the frame buffer for use in generating the first and second overlay information; and
        using a common port comprising:
            a first unidirectional output switch selectable to output at least graphic data over the first port;
            a second unidirectional output switch, operatively coupled to a first overlay image generator and the first port, configurable to selectively output at least one of graphic and video data from the first overlay image generator over the first port; and
            an input buffer operatively coupled to a video capture engine and to the first port, that receives input video data from the first port.

9. The video processing method of claim 8 including: converting graphics data in the first color space for the first overlay image generator; and converting video data in the second color space for a second overlay image generator.

10. The video processing method of claim 8 including providing data from the first port to at least one of a video encoder, a video decoder, a video compressor and a video decompressor.

* * * * *